United States Patent [19]
Chuang

[11] Patent Number: 4,799,844
[45] Date of Patent: Jan. 24, 1989

[54] ELLIPTICAL THREAD DESIGN
[75] Inventor: Jo-Yu Chuang, Sugarland, Tex.
[73] Assignee: TRW Inc, Cleveland, Ohio
[21] Appl. No.: 142,789
[22] Filed: Jan. 11, 1988
[51] Int. Cl.⁴ .............................................. F16B 35/04
[52] U.S. Cl. ..................... 411/414; 411/423; 403/307; 285/334
[58] Field of Search .................. 411/411–416, 411/423, 311, 392; 285/334, 390; 403/306, 307, 343

[56] References Cited
U.S. PATENT DOCUMENTS

| | | | |
|---|---|---|---|
| 1,884,973 | 10/1932 | Hoke | 411/311 |
| 4,040,756 | 8/1977 | Donegan | 403/307 |
| 4,084,829 | 4/1978 | Falchle et al. | 411/411 |
| 4,295,751 | 10/1981 | Holmberg | 411/411 |
| 4,549,754 | 10/1985 | Saunders et al. | 411/411 |

Primary Examiner—Neill R. Wilson
Attorney, Agent, or Firm—Reising, Ethington, Barnard, Perry & Milton

[57] ABSTRACT

A screw structure (10) is provided for male and female threads (14) having at least one thread (14) extending helically along a cylindrical support member (12) in spaced thread turns. A root portion (22) extends between adjacent thread (14) turns and has a curvature defined by a portion of an ellipse (24) for providing improved stress reduction during periods of severe loading.

6 Claims, 2 Drawing Sheets

ELLIPTICAL THREAD DESIGN

TECHNICAL FIELD

This invention relates generally to thread coupling or fastening devices, and more specifically to the shape of a root portion extending between adjacent thread turns.

BACKGROUND ART

In the art of down hole percussion drilling, such as for mining, quarrying, water well drilling, etc., the drilling elements comprising a drilling tool are frequently coupled together by threaded screw structures. In these coupled drilling elements, the thread design is critical since failure often occurs in the screw structure. Whenever failure in the screw structure does occur, the initial crack always starts at the thread root. This is due to the high stress concentrations located at the root of the threads when the screw structure is subject to severe loading.

In prior art screw structures, the root portion has a curvature defined by a portion of a circle, tangently adjoining the two flanks of the adjacent threads. Generally, the larger the radius of the circle defining the thread root, the lower the stress concentration. However, when the size of the circle surpasses a maximum allowable radius, the stress concentrations at the end of the arc, where the thread flanks tangently adjoin the root, become very high and thus provide the starting point for crack propagation. Alterenatively, when the size of the circle defining the root curvature decreased below a minimum allowable radius, the stress concentrations become very high at the bottom of the root portion. Thus, circular root curvatures are confined to radii sizes falling between maximum and minimum limits, depending on such factors as thread pitch and the like. Therefore, there is need for a root curvature having a very large radius, yet relieving the high stress concentration located where the thread flanks tangently adjoin the root portion.

The U.S. Pat. No. 4,295,751 to Holmberg, issued Oct. 20, 1981, discloses an example of a screw structure for percussion drilling elements. As shown in FIG. 3, the screw structure includes a root portion 22, 22' defined by a portion of a circle having a radius R. The Holmberg screw structure is deficient in that the circular root portion 22, 22' is subject to the above described limitations preventing the circular root curvature from surpassing the maximum allowable radius, and thus restricting the relief of additional stress concentration.

The U.S. Pat. No. 4,549,754 to Saunders et al, issued Oct. 29, 1985, discloses a screw structure for drilling elements including a root portion 20 defined by two tangential circles having proximate centers for their respective radii 31, 34. The two radii 31, 34 scribe respective circles, of which a portion of each define the root portion 20. The two radii 31, 34 are used so that a circular root having a larger equivalent can be provided while maintaining the same thread-to-thread contact length between mating male and female screw structures. However, the enlarged curvature at the root portion 20 creates the unacceptable effect of reducing the wall thickness at the bottom of the thread root 20. A reduction in the wall thickness is not tolerable for screw structures used in the percussion drilling art because the wall thickness comprises the smallest supporting area for the threads, and hence a propensity for failure exists in this area. Additionally, the stress concentration at the intersection of the non-load bearing flank 35 and the root portion 20 is very large, and is therefore another unacceptable effect produced by the root shape of the Saunders screw structure.

Accordingly, the root portions shown in the prior art are deficient in that they rely on a circular root curvature. The circular root portions are shown to be inadequate since an increase in the radius of the circular portion defining the thread root will unacceptably decrease the supporting wall thickness at the root portions. Or, if the wall thickness is not decreased, an increased circular radius defining the root portion will increase the stress concentration at the end of the arc where the thread flanks adjoin the root, and thus provide the starting point for crack propagation.

SUMMARY OF INVENTION AND ADVANTAGES

The subject invention provides a screw structure comprising a cylindrical support member having at least one thread extending helically therealong in spaced thread turns. A root portion extends between the adjacent thread turns, and has a curvature defined by a portion of an ellipse.

The elliptical curvature defining the root portion in the subject screw structure provides a larger equivalent radius at the thread root without increasing stress concentration where the thread flank adjoins the root portion. Further, the elliptical root curvature will not reduce the wall thickness measured at the root portion. Additionally, the elliptical thread design lengthens the abutting thread-to-thread contact area of engaged male and female screw structures, thereby improving the wear life of the coupling. Hence, the subject invention provides a screw structure having low stress concentrations at the critical root portions when heavily loaded, the maximum possible wall thickness for structural strength, and improved wear life from an increased thread-to-thread contact area between engaged male and female screw structures.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
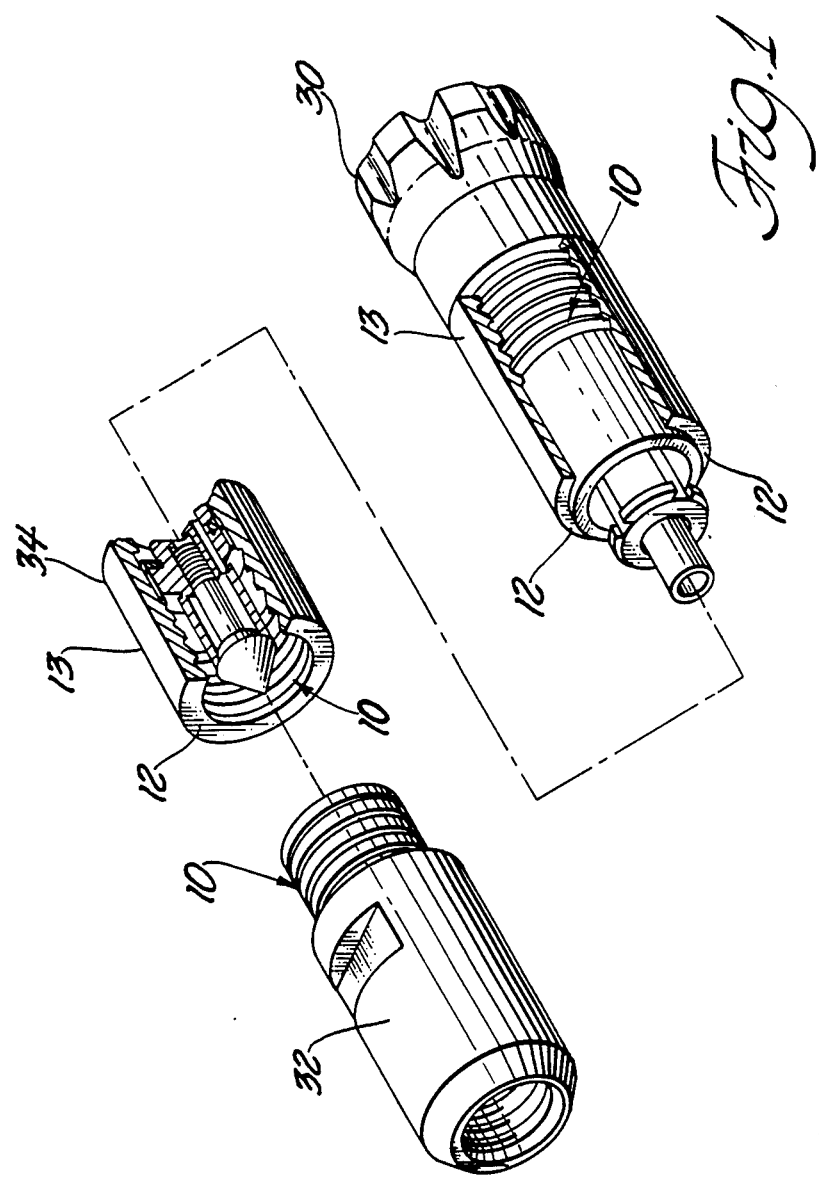
FIG. 1 is a perspective view of a percussion drilling tool including the screw structure of the subject invention, shown partially exploded and partially quarter-sectioned.

The screw structure of the subject invention is particularly suited for coupling together drilling elements fastened together to comprise a drilling tool used in down hole percussion drilling operations. Although it will be apparent to those skilled in the art that the invention may be practiced in all threaded coupling devices, the subsequent detailed description will proceed making particular reference to the percussion drilling art.

Referring the to figures, wherein like numerals indicate like or corresponding parts throughout the several views, a screw structure according to the subject invention is generally indicated at 10. The screw structure 10 comprises a cylindrical support member 12. As will be appreciated, the cylindrical support member 12 may comprise either a solid or tubular elongated shaft for externally threaded, i.e., male, screw structures 10, or an elongated cylindrical tube for internally threaded, i.e., female, screw structures 10. The screw structure 10 includes a wall surface 13 representing either the external cylindrical surface of a female screw structure 10, or the internal central bore surface of a male screw structure 10.

At least one thread 14 extends helically along the cylindrical support member 12 in spaced thread turns. That is to say, the thread 14 may be either of a single or a multiple thread lead pattern. The thread 14 includes a load bearing flank surface 16, a non-load bearing flank surface 18, and a crest portion 20 extending between the load bearing 16 and non-load bearing 18 flanks. That is, when the screw structure 10 is subject to loading, the forces will be transmitted between coupled male and female screw structures via contiguous mating load bearing flanks 16 of the respective male or female threads 14. The crest 20 is flat and extends axially of the cylindrical support member 12. In other words, the crest portion 20 extends between thread flanks 16, 18 straight and parallel of the longitudinal axis of the cylindrical support member 12.

A root portion 22 extends between adjacent thread 14 turns. The root portion 22 has a curvature defined by a portion of an ellipse, shown in phantom at 24. Said another way, the ellipse 24 profile defines the concave formation of the root portion 20, when viewed in cross section, as in FIGS. 2 and 3. The ellipse 24 has a major axis 26 and a shorter and perpendicular minor axis 28. The major axis 26 extends axially of the cylindrical support member 12. That is to say, the longer major axis 26 extends parallel of the longitudinal axis of the cylindrical support member 12, and the minor axis 28 of the ellipse 24 extends radially outwardly and perpendicularly from the longitudinal axis of the cylindrical support member 12.

Figure 2:
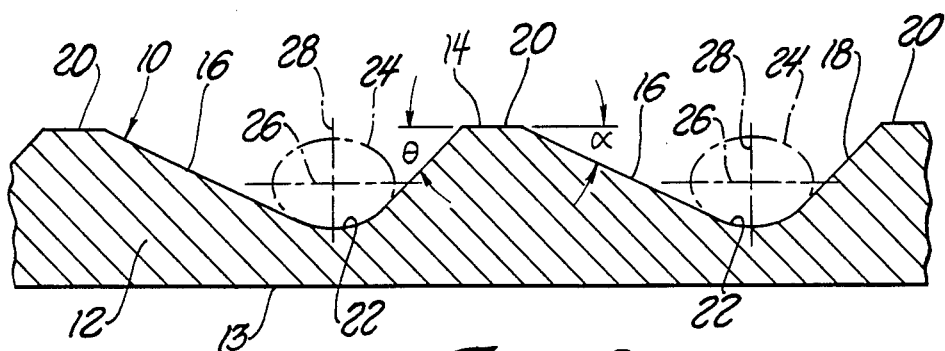
FIG. 2 is a cross sectional view of a screw structure according to the subject invention.

Preferably, the distance between the edges of the ellipse 24 across the minor axis 28 is shorter than the radial distance between the crest 20 and the root portion 22. As best shown in FIG. 2, the minor diameter of the ellipse 24, measured across the shorter minor axis 28, is less than the distance between the bottom most surface of the root portion 22 and the upper surface of the crest 20. In this manner, a maximum supporting area thickness between the wall surface 13 and the bottom of the root portion 22 is preserved, as will be fully described subsequently.

Because of the extreme loads subjected to screw structures in the percussion drilling environment, the load bearing flank 16 of the thread 14 has a greater surface area than the non-load bearing flank 18. That is, the thread profile resembles a typical reverse buttress thread profile, wherein the load bearing flanks 16 of coupled male and female screw structures 10 are provided with a longer thread-to-thread contact length, and hence greater contact area, than the non-load bearing flanks 18. The greater surface area provided on the load bearing flank 16 improves the wear life the screw structure 10.

Figure 3:
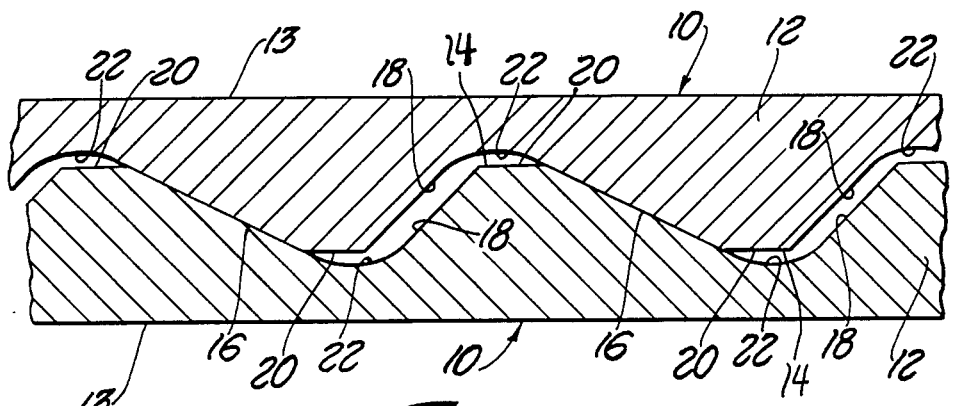
FIG. 3 is a cross sectional view of coupled male and female screw structures according to the subject invention.

As shown in FIGS. 2 and 3, the load bearing 16 and non-load bearing 18 flanks extend tangentially from the ellipse 24 at the root portion 22 straight to the crest portions 20. Preferably, the load bearing flank 16 has an angular slope, $\alpha$, extending axially away from the crest portion 20 at approximately 45°. Likewise, the non-load bearing flank 18 has an angular slope, $\theta$, extending axially away from the crest portion 20 at approximately 75°. As will be appreciated, the axial angular slope of the load bearing flank 16 is less than that of the non-load bearing flank 18 for providing the greater surface area between the crest portion 20 and the root portion 22, as described above.

In FIG. 1, a typical percussion drilling tool such as used for boring into the earth is shown partially exploded and partially quarter-sectioned. The percussion drilling tool includes a bit 30 coupled to the penetrating end of an elongated housing 34, which in turn is coupled to a head portion 32. Typically, compressed air is delivered to the drilling tool from the earth's surface for energizing a piston (not shown) to rapidly and forcefully reciprocate within the housing 34 against the bit 30. Accordingly, severe compressive and torsional forces are placed on the percussion drilling tool as it penetrates into the earth. For this reason, the mating screw structures 10 joining the various elements of the percussion drilling tool are subject to severe stress loads. The elliptical root configuration of the subject screw structure 10 provides a stronger and longer lasting coupling for use in such high stress applications.

The elliptical root portion 22 of the subject screw structure 10 provides three specific advantages over the circular root screw structures shown in the prior art.

Firstly, the elliptical root portion 22 provides a larger equivalent radius at the root portion 22 than would a circular root configuration, given the same wall thickness and angular slopes at the thread flanks. Herein, the term "equivalent radius" refers to the circular radius which mathematically approximates the curvature of the elliptical root portion 22 of the subject invention. More specifically, the equivalent radius equals that circular radius which would define a portion of a circular curvature most nearly equivalent to the elliptical curvature of the subject root portion 22. Therefore, since a circular root radius having the same wall thickness and angular sloped thread flanks would be shorter than the equivalent radius of the elliptical root portion 22, a greater relief in stress concentration at the root portion 22 is provided.

Secondly, the subject screw structure 10 is stronger than a comparable circular root screw structure because a greater supporting thickness between the bottom of the root portion 22 and the wall surface 13 is preserved. This results from the larger equivalent radius provided by the elliptical root portion 22, as described above. When the stress equation is considered in connection with the thickness between the wall surface 13 and the root portion 22, the concern for wall thickness preservation becomes readily apparent. More specifically, the stress level is represented by the equation: stress = force/area, with "area" equalling the cross sectional area taken perpendicular to the longitudinal axis of the cylindrical support member 12. Because the cross sectional area is the smallest between the thread root 22 and the wall surface 13, that area represents the weakest point in the screw structure 10. Therefore, by maximizing the wall thickness a lower stress level is realized in the screw structure 10.

Thirdly, the elliptical root configuration of the subject screw structure 10 allows for greater thread-to-thread contact between abutting load bearing flanks 16 of coupled male and female threads. More specifially, the maximum thread-to-thread contact length equals the axially measured flank distance between the crest portion 20 and the tangent of the ellipse 24 where the flank 16 adjoins. As will be appreciated, a prior art circular root configuration which maintains the same wall thickness as an elliptical root portion 22 will have a shorter thread-to-thread contact length, and hence smaller load bearing contact area, because the tangent point where the thread flank adjoins the circular root is spaced further from the bottom of the root portion than a comparable elliptical root portion 22. Therefore, the elliptical root portion 22 of the subject screw structure 10 ultimately provides a longer wear life than the prior art screw structures having circular root configurations.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A screw structure (10) comprising: a cylindrical support member (12); at least one thread (14) extending helically along said cylindrical support member (12) in spaced thread turns, said thread (14) including a load bearing flank surface (16), a non-load bearing flank surface (18), and a crest portion (20) extending between said load bearing flank (16) and said non-load bearing flank (18); a root portion (22) extending between adjacent thread (14) turns; said screw structure (10) characterized by said root portion (22) having a curvature defined by a portion of an ellipse (24) having a major axis (26) and a shorter and perpendicular minor axis (28) with said major axis (28) extending axially of said cylindrical support member (12) and said ellipse (24) tangentially adjoining said load bearing flank (16) and said non-load bearing flank (18).

2. A structure (10) set forth in claim 1 further characterized by said crest (20) being flat and extending axially of said cylindrical support member (12).

3. A structure (10) as set forth in claim 2 further characterized by said load bearing flank (16) having a greater surface area than said non-load bearing flank (18).

4. A structure (10) as set forth in claim 3 further characterized by said minor axis (28) of said ellipse (24) being shorter than the radial distance between said crest portion (20) and said root portion (22).

5. A structure (10) as set forth in claim 4 further characterized by said load bearing flank (16) having an angular slope ($\alpha$) extending axially away from said crest portion (20) approximately 45 degrees, and said non-load bearing flank (18) having an angular slope ($\theta$) extending axially away from said crest portion (20) approximately 75 degrees.

6. A screw structure (10) comprising: a cylindrical support member (12); at least one thread (14) extending helically along said cylindrical support member (12) in spaced thread (14) turns, said thread (14) including a load bearing flank (16), a non-load bearing flank (18), a crest portion (20) extending between said load bearing (16) and said non-load bearing flanks (18), said load bearing flank (16) having a greater surface area and said non-load bearing flank (18); a root portion (22) extending between said adjacent thread (14); said screw structure (10) characterized by said root portion (22) having a curvature defined by a portion of an ellipse (24) including a major axis (26) and a shorter perpendicular minor axis (28), said major axis (26) extending axially of said cylindrical support member (12), said ellipse (24) tangentially adjoining said load bearing flank (16) and said non-load bearing flank (18).

* * * * *